(12) United States Patent (10) Patent No.: US 9,329,677 B2
Chien et al. (45) Date of Patent: May 3, 2016

(54) SOCIAL SYSTEM AND METHOD USED FOR BRINGING VIRTUAL SOCIAL NETWORK INTO REAL LIFE

(75) Inventors: Shao-Yi Chien, Taipei (TW); Jui-Hsin Lai, Taipei (TW); Jhe-Yi Lin, Taipei (TW); Min-Yian Su, Taipei (TW); Po-Chen Wu, Taipei (TW); Chieh-Chi Kao, Taipei (TW)

(73) Assignee: National Taiwan University, Taipei (TW)

( * ) Notice: Subject to any disclaimer, the term of this patent is extended or adjusted under 35 U.S.C. 154(b) by 203 days.

(21) Appl. No.: 13/420,966

(22) Filed: Mar. 15, 2012

(65) Prior Publication Data

US 2013/0169680 A1 Jul. 4, 2013

(30) Foreign Application Priority Data

Dec. 29, 2011 (TW) .............................. 100149582 A

(51) Int. Cl.
*G06F 3/01* (2006.01)
*G06F 3/0481* (2013.01)

(52) U.S. Cl.
CPC ............ *G06F 3/011* (2013.01); *G06F 3/04815* (2013.01)

(58) Field of Classification Search
USPC ......................................................... 345/633
See application file for complete search history.

(56) References Cited

U.S. PATENT DOCUMENTS

| 7,620,902 | B2 | 11/2009 | Manion et al. |
| 8,024,317 | B2 | 9/2011 | Nair et al. |
| 2002/0194006 | A1 | 12/2002 | Challapali |
| 2005/0069852 | A1* | 3/2005 | Janakiraman et al. ......... 434/236 |
| 2006/0064431 | A1 | 3/2006 | Kishore et al. |
| 2009/0164897 | A1 | 6/2009 | Amer-Yahia et al. |
| 2009/0204601 | A1 | 8/2009 | Grasset |
| 2011/0016121 | A1 | 1/2011 | Sambrani et al. |
| 2011/0137137 | A1* | 6/2011 | Shin et al. ...................... 600/301 |
| 2011/0221669 | A1* | 9/2011 | Shams et al. .................. 345/156 |

(Continued)

FOREIGN PATENT DOCUMENTS

| JP | 2005-293280 A | 10/2005 |
| TW | 201008222 A | 2/2010 |
| TW | 201035967 A | 10/2010 |

OTHER PUBLICATIONS

Stone, Zak, Todd Zickler, and Trevor Darrell. "Autotagging facebook: Social network context improves photo annotation." Computer Vision and Pattern Recognition Workshops, 2008. CVPRW'08. IEEE Computer Society Conference on. IEEE, 2008.*

*Primary Examiner* — Mark Zimmerman
*Assistant Examiner* — Vu Nguyen
(74) *Attorney, Agent, or Firm* — Rosenberg, Klein & Lee

(57) ABSTRACT

The present invention is related to a social system and process used for bringing virtual social network into real life, which is allowed for gathering and analyzing a social message of at least one interlocutor from virtual social network so as to generate at least one recommended topic, allowing a user to talk with the interlocutor through the utilization of the recommended topic, and then capturing and analyzing at least one speech and behavior and/or physiological response of the interlocutor during talking so as to generate an emotion state of the interlocutor. The user is allowed to determine whether the interlocutor is interested in the recommended topic through the emotion state of interlocutor. Thus, it is possible to bring the social message on virtual network into real life, so as to increase communication topics between persons in real life.

19 Claims, 7 Drawing Sheets

(56) References Cited

U.S. PATENT DOCUMENTS

| | | | |
|---|---|---|---|
| 2012/0026191 A1* | 2/2012 | Aronsson et al. | 345/633 |
| 2012/0036127 A1* | 2/2012 | Work et al. | 707/732 |
| 2012/0136219 A1* | 5/2012 | Huang et al. | 600/300 |
| 2013/0077833 A1* | 3/2013 | Kritt et al. | 382/118 |
| 2013/0121591 A1* | 5/2013 | Hill | 382/195 |

* cited by examiner

SOCIAL SYSTEM AND METHOD USED FOR BRINGING VIRTUAL SOCIAL NETWORK INTO REAL LIFE

FIELD OF THE INVENTION

The present invention is related to a social system and method used for bringing virtual social network into real life, particularly to a social system and method capable of increasing communication topics between persons in real life by utilizing social message on virtual networks.

BACKGROUND

Nowadays, as network technology develops more and more, network becomes an indispensable part in life of people gradually. On-line talking, shopping, web browsing, data inquiry, message transmission or interaction in social website and so on, are often performed on network for people.

More fun and convenience may be gained by people in life by means of application of network. For some people, however, the difference between network world and the real world could not be distinguished due to unconscious indulgence in network. These people are capable of talking with others freely in the virtual network world (such as social network), while unconfident in the real world due to lack of experience in directly face-to-face communication with others ordinarily, resulting in gradual estrangement from real life and thus tension or indifference in interpersonal relationship day by day.

Here, how to pull people back to real life from virtual network world and bring social message of virtual network into real life, so as to increase communication topics between persons in real life, further improving interpersonal relationship, is the object that the present invention is intended to achieve.

SUMMARY OF THE INVENTION

It is one object of the present invention to provide a social system and method used for bringing virtual social network into real life, in which social message of at least one interlocutor is gathered and analyzed in virtual social network to generate at least one recommended topic, which may be utilized by a user to talk with the interlocutor directly, whereby communication topics between persons in real life may be increased, further resulting in improved interpersonal relationship.

It is one object of the present invention to provide a social system and method used for bringing virtual social network into real life, in which a recommended topic is utilized by a user to talk with an interlocutor, while speech and behavior or physiological response of the interlocutor may be detected during talking, so as to generate an emotion state of interlocutor, which is allowed for the user to determine whether the interlocutor is interested in the recommended topic.

It is one object of the present invention to provide a social system and method used for bringing virtual social network into real life, which may be applied in an electronic glasses having an image window, a user wearing the electronic glasses being allowed for viewing a recommended topic and an emotion state of interlocutor displayed on the image window.

It is one object of the present invention to provide a social system and method used for bringing virtual social network into real life, which is allowed for shooting a real scene in which the user talks with the interlocutor as well as recognizing the content of scene, location of scene and/or shooting time of the real scene. The social message of interlocutor and/or the scene recognition result may be analyzed so as to generate at least one recommended topic in which the interlocutor may be interested and which is suitable for the occasion.

To achieve above objects, the present invention provides a social system used for bringing virtual social network into real life comprising: a social message processing module, gathering and analyzing a social message of at least one interlocutor from virtual social network so as to generate at least one recommended topic, the recommended topic being used by a user to talk with the interlocutor; a video/audio capture module, capturing at least one speech and behavior of the interlocutor; and an emotion analysis module, analyzing the speech and behavior of the interlocutor so as to generate an emotion state of the interlocutor.

In one embodiment of the present invention, wherein the recommended topic and the emotion state of the interlocutor are displayed on an image window.

In one embodiment of the present invention, wherein the video/audio capture module comprises a face recognition unit, the face recognition unit being used to recognize the face feature of interlocutor, and then to compare the recognized face feature of interlocutor with at least one personal picture to which each identity account on social network corresponds, so as to ascertain the identity of interlocutor.

In one embodiment of the present invention, the social system further comprises a camera module, the camera module is used to shoot a real scene in which the user talks with the interlocutor, the video content of the real scene is displayed on the image window In one embodiment of the present invention, the social system further comprises an augmented reality processing module, the augmented reality processing module comprises an unsalient region recognition unit, the unsalient region recognition unit recognize at least one unsalient region from the real scene, the augmented reality processing module draws the recommended topic and the emotion state in the unsalient region.

In one embodiment of the present invention, wherein the recommended topic and the emotion state are drawn in the unsalient region via the means of an object type.

In one embodiment of the present invention, wherein the augmented reality processing module further comprises: a photorealistic rendering unit, performing a photorealistic rendering procedure on the recommended topic and the emotion state of the object type drawn in the unsalient region; and a stable rendering unit, used to render the recommended topic and the emotion state of the object type in an appropriate place of the unsalient region steady; wherein when the unsalient region within the real scene is moved since the shooting angle changes, the recommended topic and the emotion state of the object type are adjusted in placement by the stable rendering unit correspondingly.

In one embodiment of the present invention, wherein the social system further comprises an augmented reality processing module, the augmented reality processing module comprises a scene recognition unit, the scene recognition unit is used to recognize and analyze the content of scene, location of scene and/or shooting time of the real scene so as to generate a scene recognition result, the social message of the interlocutor and/or the scene recognition result is analyzed by the social message processing module so as to generate the recommended topic.

In one embodiment of the present invention, wherein the social system is installed in a mobile phone, a computer, an electronic glasses capable of displaying data message, or an electronic device capable of displaying data message.

The present invention further provides a social system used for bringing virtual social network into real life comprising: a social message processing module, gathering and analyzing a social message of at least one interlocutor from virtual social network so as to generate at least one recommended topic, the recommended topic being used by a user to talk with the interlocutor; a physiology capture module, capturing at least one physiological response of the interlocutor; and an emotion analysis module, analyzing the physiological response of the interlocutor so as to generate an emotion state of the interlocutor.

In one embodiment of the present invention, wherein the physiology capture module is a body temperature sensor, a blood pressure monitor, a breath monitor, a brain waves inspector, a pupil detector and/or an equipment capable of inspecting the physiological response of body.

The present invention further provides a social method used for bringing virtual social network into real life comprising: gathering and analyzing a social message of at least one interlocutor from virtual social network so as to generate at least one recommended topic; allowing a user to talk with the interlocutor through the utilization of the recommended topic; capturing at least one speech and behavior and/or physiological response of the interlocutor; and analyzing the speech and behavior and/or the physiological response of the interlocutor so as to generate an emotion state of the interlocutor.

In one embodiment of the present invention, the steps of the social method further comprising: shooting a real scene in which the user talks with the interlocutor; recognizing the content of scene, location of scene and/or shooting time of the real scene so as to generate a scene recognition result; and analyzing the social message of the interlocutor and/or the scene recognition result so as to generate the recommended topic.

DETAILED DESCRIPTION

Figure 1:
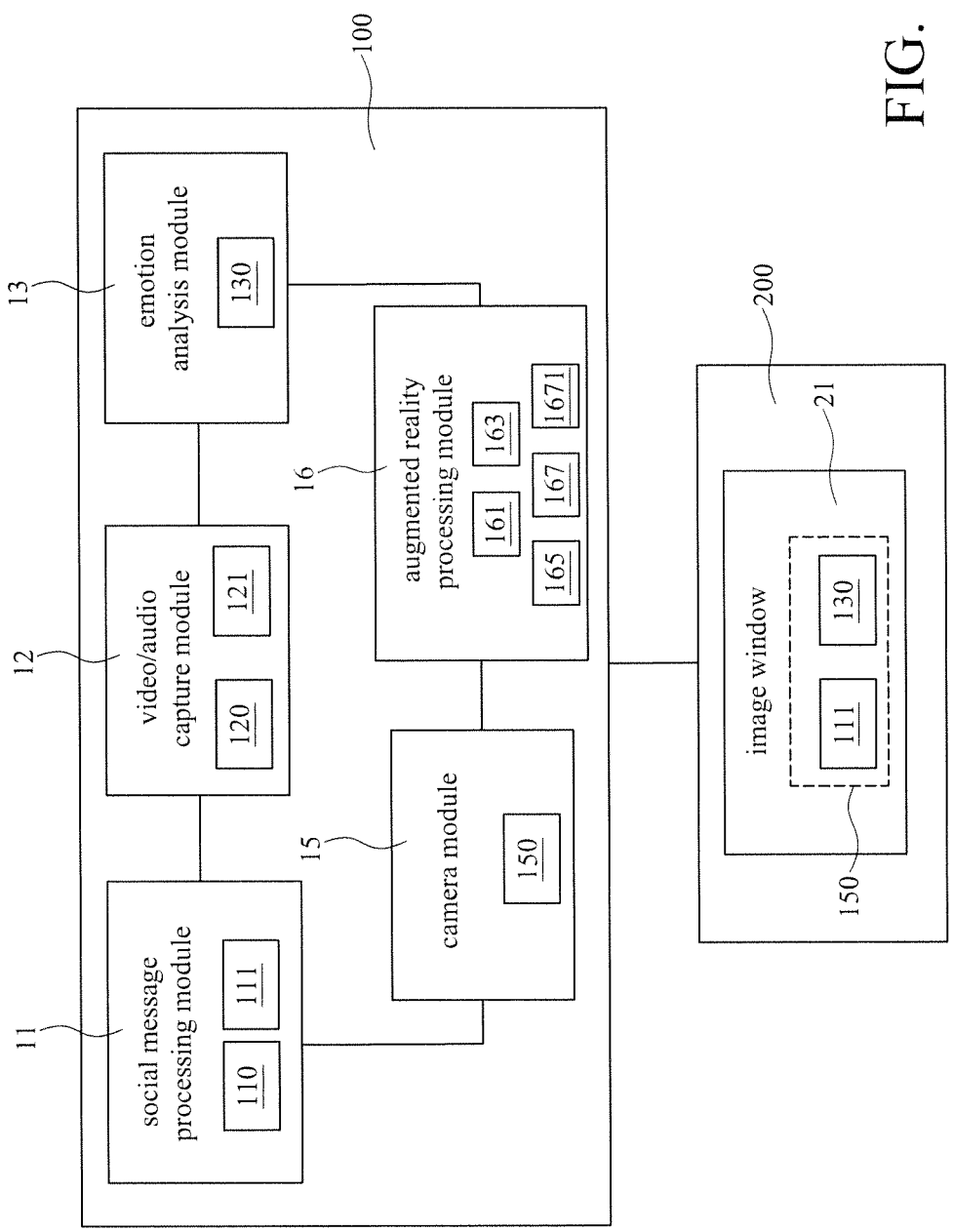
FIG. 1 is a system structure chart for a social system bringing virtual social network into real life according to one preferred embodiment of the present invention.

Referring to FIG. 1, there is shown a system structure chart for a social system bringing virtual social network into real life according to one preferred embodiment of the present invention. As illustrated in this figure, the social system 100 comprises a social message processing module 11, a video/audio capture module 12, and an emotion analysis module 13. Wired or wireless network connection may be used for the social system 100 selectively.

When a user of the system 100 is ready to talk with at least one interlocutor, a social message 110 of interlocutor (such as identity, preferred multimedia information, recommended information, browsed information, shared information and so on of interlocutor) may be pre-gathered by the social message processing module 11 firstly on social network (such as Facebook, Twitter, YouTube, MySpace and so on). Subsequently, the gathered social message 110 of interlocutor may be analyzed by the social message processing module 11, so as to generate at least one recommended topic 111, such as traveling, reading, tennis, living topics, for example.

The recommended topic 111 may be used by the user to talk with the interlocutor. Speech and behavior 120 of interlocutor, such as tone, facial expression, body movement and/or content of talk, for example, may be detected by the video/audio capture module 12 during talking. The speech and behavior 120 of interlocutor is analyzed by the emotion analysis module 13 so as to generate an emotion state 130 of interlocutor. The emotion state 130 is used to express the emotional response of interlocutor during talking.

For instance, one of topics 111 (such as traveling topic) recommended by the system 100 may be utilized by the user to talk with the interlocutor. If the speech and behavior 120 of high-pitched tone, joyous expression revealed on face, rich body movement, and/or talking about interesting travel experience is expressed by the interlocutor during talking, the emotion state 130 of a positive response (such as delight), implying the interest of interlocutor in traveling topic, may be generated by the system 100 correspondingly according to this speech and behavior 120.

Alternatively, another topic 111 (such as living topic) recommended by the system 100 may be utilized by the user to talk with the interlocutor. If lifeless tone, expressionless face, drifting eye contact and/or few words are expressed by the interlocutor, the emotion state 130 of a negative response (such as boredom), implying unwillingness to discuss the traveling topic with the interlocutor, may be generated by the system 100 correspondingly according to this speech and behavior 120.

As such, whether the interlocutor is interested in the recommended topic 111 or not may be determined by the user through the emotion state 130 of either positive or negative response, and whether talking with the interlocutor about the current recommended topic 111 continuously or talking with the interlocutor about another recommended topic 111 alternatively may be further determined.

In practical situation, of course, it is also possible for the interlocutor neither being willing to talk with anyone due to bad mood, nor being willing to talk with the user about any topic basically, in such a way that the emotion state 130 of interlocutor detected by the social system 100 always shows the negative response. In this case, the user may be also allowed to further consider stopping any talk with the interlocutor.

In this embodiment, the social system 100 of the present invention may be allowed to bring social message on virtual network into real life, and provide the user with at least one recommended topic 111 in which the interlocutor may be interested, allowing the user to talk with the interlocutor about the recommended topic 111, in such a way that the communication topics between persons in real life may be increased, further achieving the object of improving interpersonal relationship.

Figure 2:
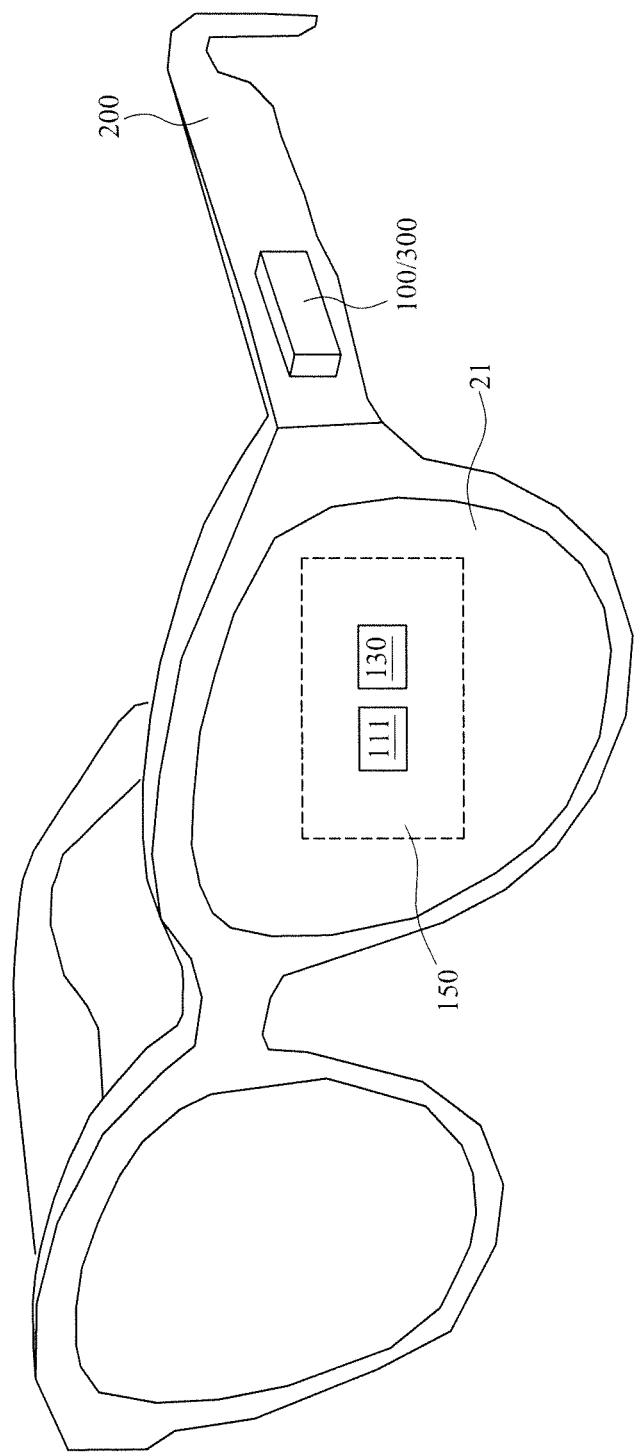
FIG. 2 is a diagram of an application of a social system of the present invention installed in an electronic glasses.

In one embodiment of the social system 100 of the present invention, as shown in FIG. 2, the social system 100 may be also installed in an electronic glasses 200 having an image window 21, the image window 21 being the lens element of the electronic glasses 200. The recommended topic 111 and the emotion state 130 of interlocutor generated by the system 100 may be displayed on the image window 21 via characters or pictures. In practical application, the user may talk with the interlocutor face-to-face directly when wearing the electronic glasses 200, and may be then notified the recommended topic 111 and the emotion state 130 of interlocutor provided by the system 100 immediately through viewing the image window 21 of the electronic glasses 200 while talking.

In one embodiment of the present invention, referring to FIG. 1 again, the identity of interlocutor may be also known to the user in advance, and then set the identity of interlocutor in the social message processing module 11 manually. Afterwards, the social message 110 of interlocutor may be then searched and gathered on social network by the social message processing module 11 based on the identity of interlocutor set by the user manually.

Alternatively, in another embodiment of the present invention, the video/audio capture module 12 comprises a face recognition unit 121. On talking face-to-face between the user and interlocutor, the face recognition unit 121 may be allowed to detect the face feature of interlocutor automatically, and then compare the detected face feature of interlocutor with the personal picture to which each identity account on social network corresponds, so as to ascertain the identity of interlocutor. Afterwards, the social message 110 of interlocutor may be then searched and gathered on social network by the social message processing module 11 based on the identity of interlocutor recognized by the face recognition unit 121.

Furthermore, the face recognition unit 121 may be also allowed to recognize face feature of interlocutor of several interlocutors so as to ascertain the identity of several interlocutors simultaneously, further achieving the capability of social talk with a plurality of interlocutors simultaneously for the user.

The social system 100 further comprises a camera module 15 and an augmented reality (AR) processing module 16. The camera module 15 is used to shoot a real scene 150 in which the interlocutor talks with the user, and the video content of the real scene 150 may be displayed on the image window 21. Moreover, the recommended topic 111 and the emotion state 130 may be drawn in the real scene 150 through the utilization of augmented reality processing module 16, as shown in FIG. 3.

The augmented reality processing module 16 comprises an unsalient region recognition unit 161, a photorealistic rendering unit 163 and a stable rendering unit 165.

Figure 3:
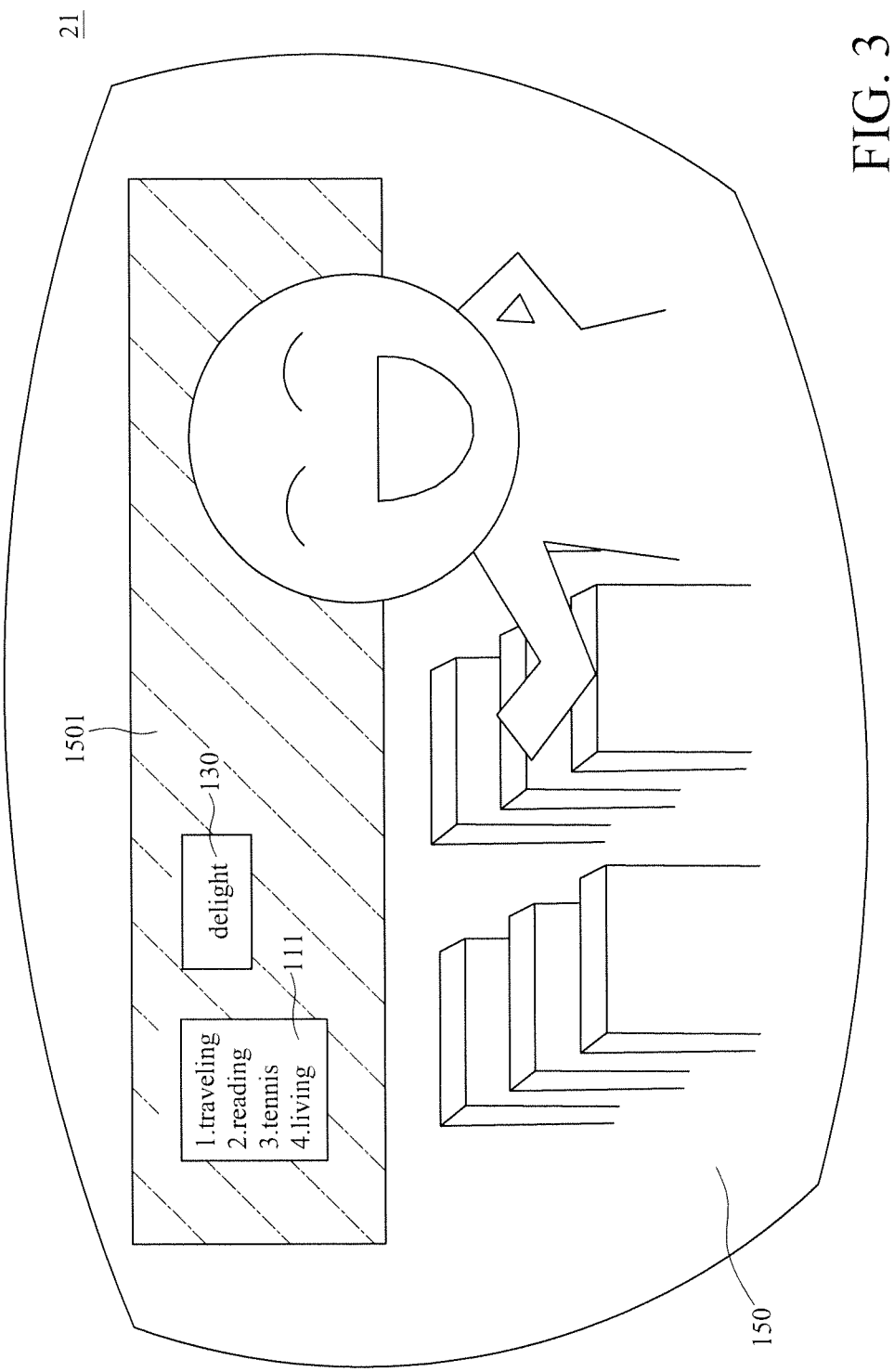
FIG. 3 is a diagram of scene showing a real scene displayed on an image window of the present invention.

As shown in FIG. 3, the unsalient region recognition unit 161 is capable of recognizing at least one unsalient region 1501 from the real scene 150, the unsalient region 1501 being an region of which a viewer (such as the user of the system mentioned in the present invention) is less aware when viewing the real scene 150. In this embodiment, for instance, the real scene 150 is a scene shot in a classroom, and the unsalient region 1501 is then a blackboard, a trashcan, a desk or a window. The augmented reality processing module 16 may be allowed to draw the recommended topic 111 and the emotion state 130 of interlocutor in the unsalient region 1501 via the means of a virtual object type, in such a way that hiding the salient region (such as the area where the interlocutor is located or the area where the contours of image is complex) in the real scene 150 by the recommended topic 111 and the emotion state 130 of interlocutor, resulting in visual confusion generated for the user viewing the real scene 150, may be avoided.

When the recommended topic 111 and the emotion state 130 of the object type are drawn in the unsalient region 1501 of the real scene 150, the photorealistic rendering unit 163 is used to perform a photorealistic rendering procedure on the recommended topic 111 and the emotion state 130 of the object type with reference to the background light of the real scene 150 correspondingly, in such a way that the recommended topic 111 and the emotion state 130 of the object type may be blended into the real scene 150 naturally, so as to achieve the highly realistic effect.

Figure 4:
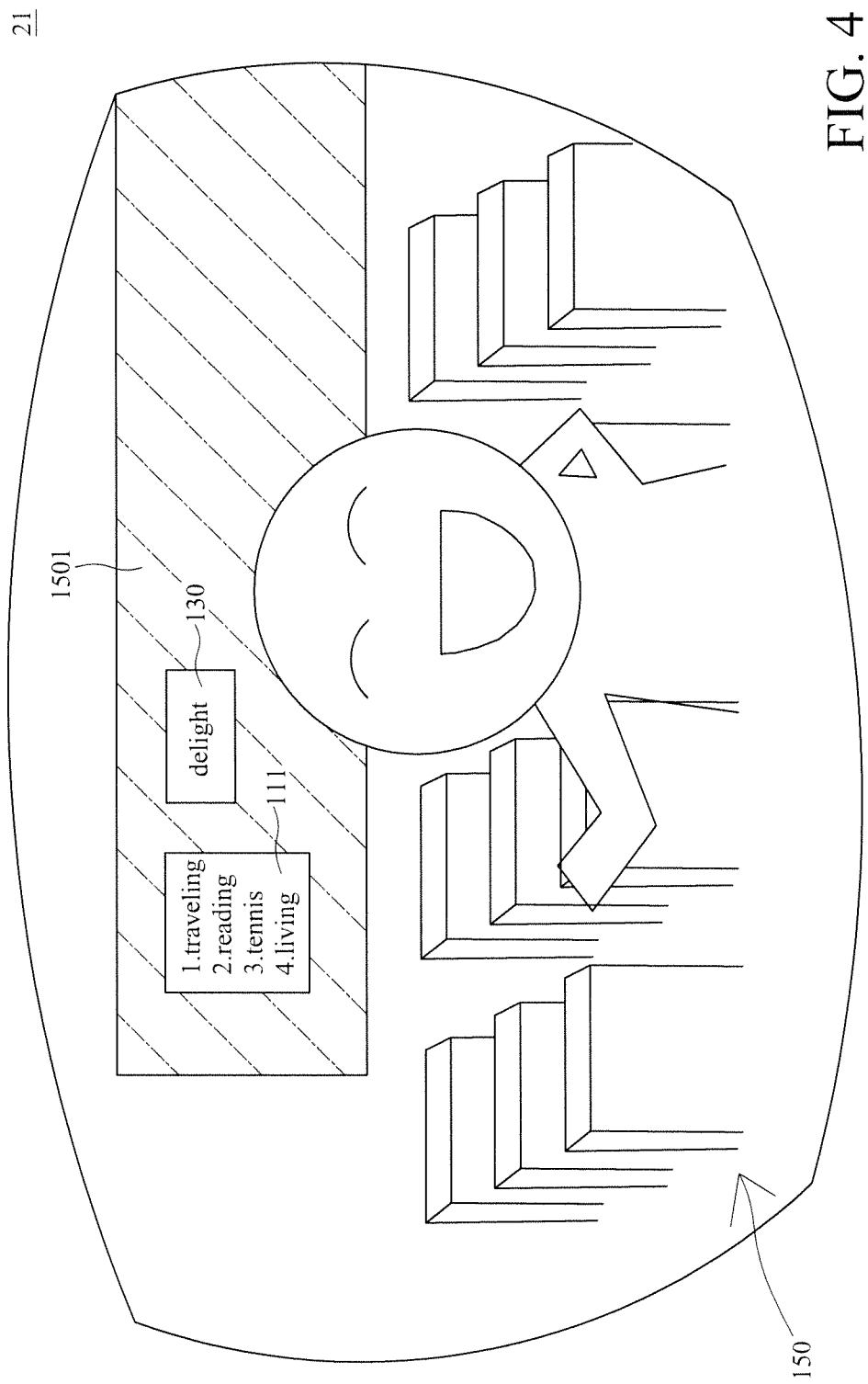
FIG. 4 is a diagram of scene showing another real scene displayed on an image window of the present invention.

Moreover, the stable rendering unit 165 is used to draw the recommended topic 111 and the emotion state 130 of the object type in an appropriate place of the unsalient region 1501 steady. Thus, as shown in FIG. 4, when the unsalient region 1501 within the real scene 150 is moved since the shooting angle changes, the recommended topic 111 and the emotion state 130 of the virtual object type may be adjusted in placement by the stable rendering unit 165 correspondingly, so as to avoid the positioning of the recommended topic 111 and the emotion state 130 of the virtual object type drawn to the salient region due to varied shooting angles. The unsalient region 1501, of course, may be also possibly disappeared or decreased in the real scene 150 due to the variation of shooting angle, such that the recommended topic 111 and the emotion state 130 of the virtual object type may be not drawn. Therefore, a new unsalient region 1501 may be recognized from the current shot real scene 150 again by the unsalient region recognition unit 161.

The recommended topic 111 and the emotion state 130 of the virtual object type may be joined seamlessly with and then integrated naturally with the real scene 150 through the image processing procedure performed by the unsalient region recognition unit 161, the photorealistic rendering unit 163 and the stable rendering unit 165.

In another embodiment of the present invention, additionally, the augmented reality processing module 16 further comprises a scene recognition unit 167. The scene recognition unit 167 is used to recognize and analyze the content of scene, location of scene and/or shooting time of the real scene 150, so as to generate a scene recognition result 1671. In addition to the gathered social message 110 of interlocutor, the social message processing module 11 of the present embodiment further analyzes the scene recognition result 1671 so as to generate the recommended topic 111 in which the interlocutor may be interested and which is suitable for the occasion.

For instance, if the content of scene of the real scene 150 is recognized as, by the scene recognition unit 167, populousness, a hospital of location of scene and a daytime of shooting time, it is found, in the analysis provided by the social message processing module 11 according to this scene recognition result 1671, that this occasion is not suitable for talking about excessively joyous and private matter, so as to avoid the generation of inopportune recommended topic 111.

Continuously, the social system 100 of the present invention may be installed not only in the electronic glasses 200, but also in a mobile phone, a computer, or an electronic device capable of displaying data message, selectively. Moreover, the social system 100 may be applied in face-to-face talking between the user and interlocutor, but also selectively applied in the case of video talk between the user and interlocutor.

Figure 5:
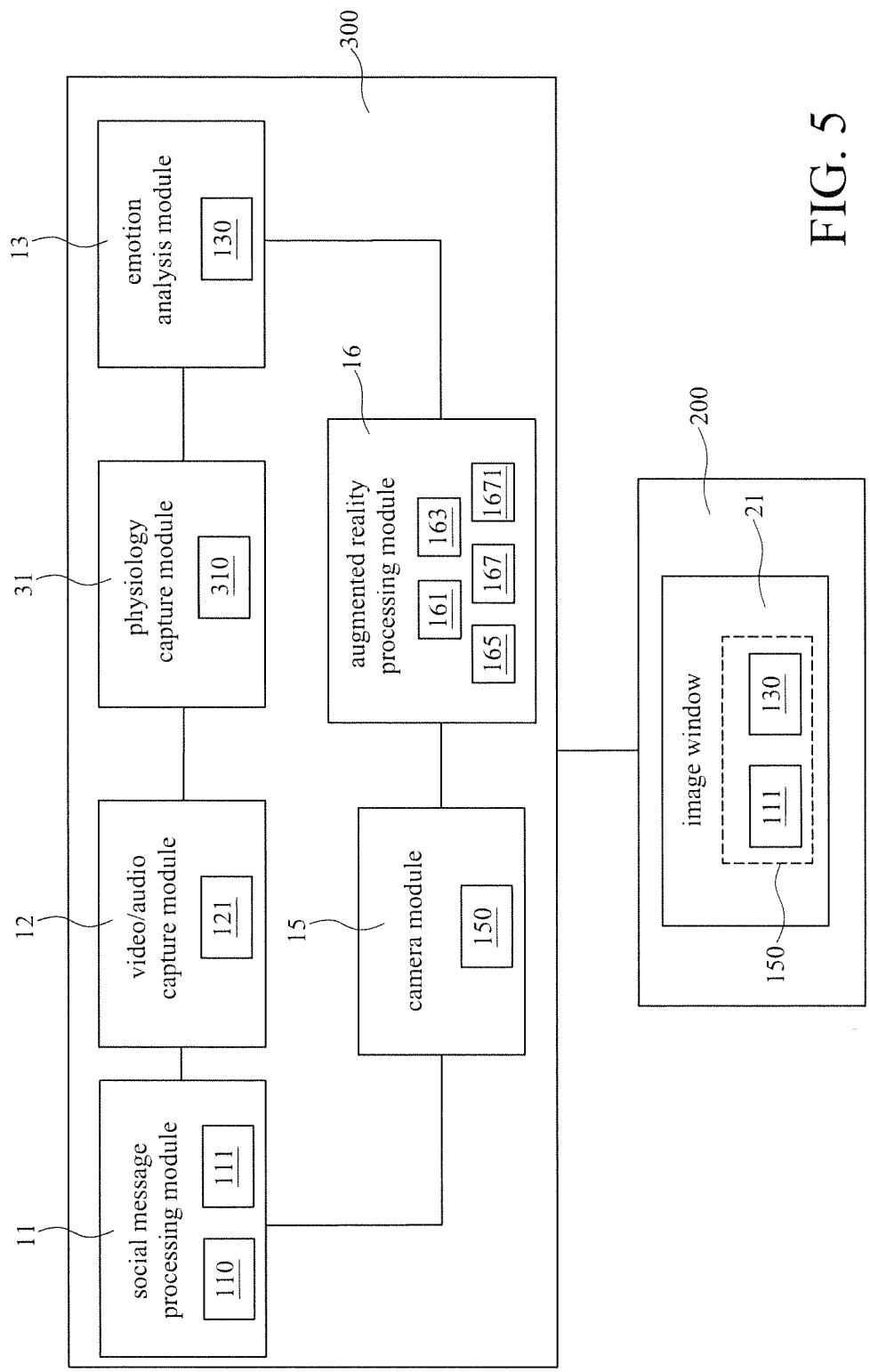
FIG. 5 is a system structure chart for a social system bringing virtual social network into real life according to another embodiment of the present invention.

Referring to FIG. 5, there is shown a system structure chart for a social system bringing virtual social network into real life according to another embodiment of the present invention. The social system 300 of the present embodiment is similar to the social system 100 of the above embodiment in system structure, with the difference therebetween being as follows. The speech and behavior 120 of interlocutor is captured by the social system 100 in the above embodiment through the usage of the video/audio capture module 12, so as to analyze whether the interlocutor is interested in the recommended topic 111; while a physiological response 310 of interlocutor is captured by the social system 300 of the present embodiment alternatively through the usage of a physiology capture module 31, so as to analyze whether the interlocutor is interested in the recommended topic 111.

Same as above, when a user of the system 300 is ready to talk with at least one interlocutor, a social message 110 of interlocutor may be pre-gathered by the social message processing module 11 firstly on social network. Subsequently, the gathered social message 110 of interlocutor may be analyzed by the social message processing module 11, so as to generate at least one recommended topic 111.

The recommended topic 111 may be used by the user to talk with the interlocutor. The physiological response 310 (body temperature, breath, blood pressure, heartbeat, brain waves, pupil) generated on the body of interlocutor may be detected by the physiology capture module 31 during talking. Afterwards, the physiological response 310 of interlocutor is analyzed by the emotion analysis module 13 so as to generate an emotion state 130 of interlocutor correspondingly.

In this embodiment, whether the interlocutor is interested in the recommended topic 111 may be also found in the analysis provided by the social system 300 of the present embodiment when the physiological response 310 generated on the body of interlocutor is detected by the physiology capture module 31.

In addition, the physiology capture module 31 mentioned in the present embodiment may also comprise a body temperature sensor, a blood pressure monitor, a breath monitor, a brain waves inspector, a pupil detector and/or an equipment capable of detecting the physiological response of body.

Furthermore, elements, except for the physiology capture module 31 of the social system 300 of the present embodiment, are essentially the same as those of the social system 100 of the above embodiment in the way to embody and in the application thereof, and thus should not be explained repeatedly herein.

Figure 6:
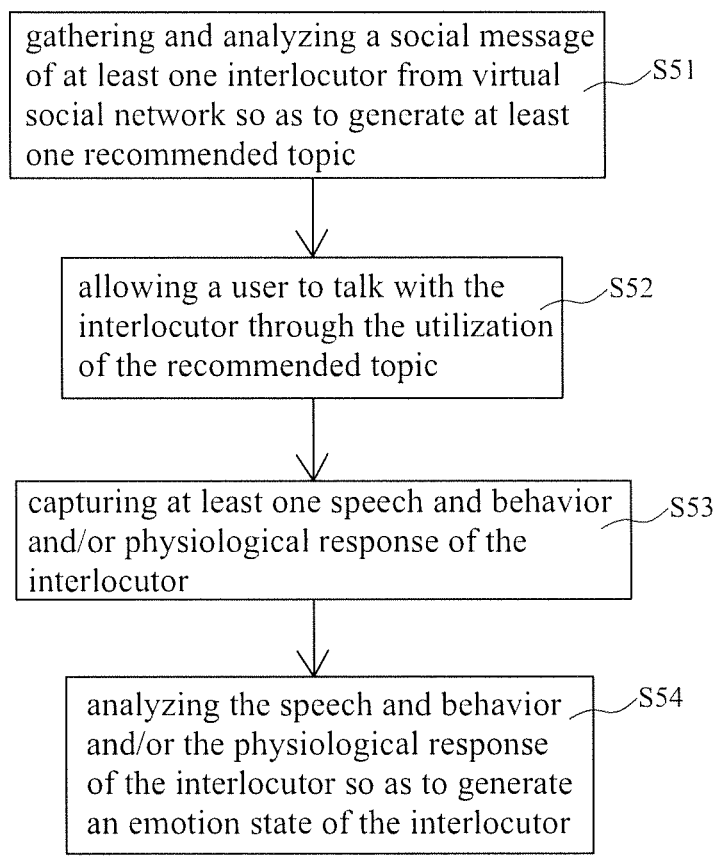
FIG. 6 is a flow chart of a social process bringing virtual social network into real life according to one preferred embodiment of the present invention.

Referring to FIG. 6, there is shown a flow chart of a social process bringing virtual social network into real life according to one preferred embodiment of the present invention, the social process being applied in an electronic device (such as an electronic glasses, a mobile phone, a computer, for example). In step S51, firstly, as shown in this figure, networking is performed by a user through the electronic device, and the social message 110 of at least one interlocutor is gathered form virtual social network. The gathered social message 110 of interlocutor is analyzed to generate at least one recommended topic 111 correspondingly.

In step S52, one of the recommended topics 111 is selected and the selected recommended topic 111 is then used by the user to talk with the interlocutor. In step S53, the speech and behavior 120 of interlocutor and/or the physiological response 310 on the body of interlocutor may be captured during talking. In step S54, subsequently, the speech and behavior 120 and/or the physiological response 310 of interlocutor may be analyzed so as to generate the emotion state 130 of interlocutor.

Afterwards, whether the interlocutor is interested in the recommended topic 111 may be determined by the user through the emotion state 130 of interlocutor, and then talking with the interlocutor about whether the current recommended topic 111 continuously or another recommended topic 111 alternatively may be further decided.

Figure 7:
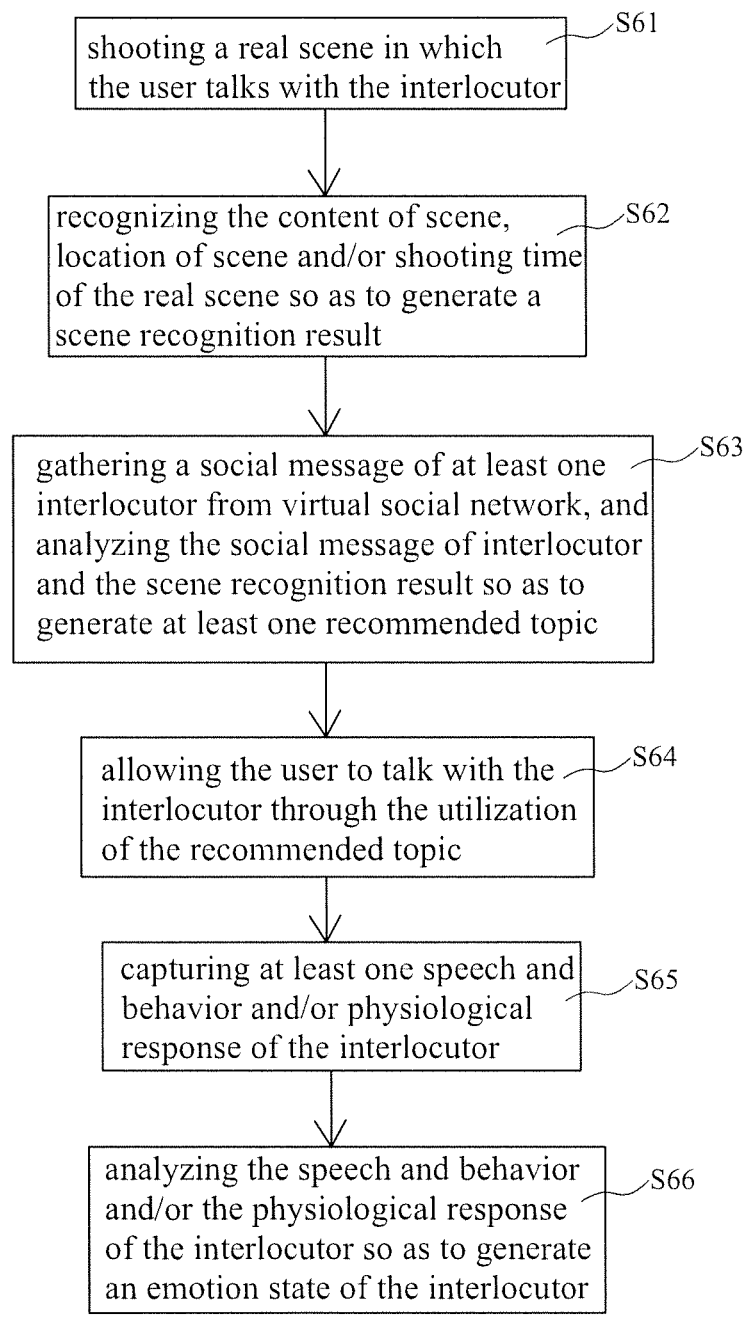
FIG. 7 is a flow chart of a social process bringing virtual social network into real life according to another embodiment of the present invention

Referring to FIG. 7, there is shown a flow chart of a social process bringing virtual social network into real life according to another embodiment of the present invention, the social process being applied in an electronic device. In step S61 firstly, as shown in this figure, a user is allowed to shoot the real scene 150 in which the user talks with an interlocutor by means of the camera module 15 of the electronic device.

In step S62, the content of scene, location of scene and/or shooting time of the real scene 150 may be recognized, so as to generate a scene recognition result 1671.

In step S63, further networking is performed by the user through the electronic device, and the social message 110 of at least one interlocutor is gathered from virtual social network. The gathered social message 110 of interlocutor and the scene recognition result 1671 are analyzed to generate at least one recommended topic 111.

In step S64, one of the recommended topics 111 is selected and the selected recommended topic 111 is then used by the user to talk with the interlocutor. In step S65, the speech and behavior 120 of interlocutor and/or the physiological response 310 on the body of interlocutor may be captured during talking. In step S66, subsequently, the speech and behavior 120 and/or the physiological response 310 of interlocutor may be analyzed so as to generate the emotion state 130 of interlocutor.

Afterwards, whether the interlocutor is interested in the recommended topic 111 may be determined by the user through the emotion state 130 of interlocutor, and then talking with the interlocutor about whether the current recommended topic 111 continuously or another recommended topic 111 alternatively may be further decided.

To sum up, the social system and process of the present invention may be allowed for bringing social message on virtual network into real life, and provided for increasing communication topics between persons in real life, whereby a better social effect is achieved, further improving interpersonal relationship.

The foregoing description is merely one embodiment of the present invention and not considered as restrictive. All equivalent variations and modifications in shape, structure, feature, and spirit in accordance with the appended claims may be made without in any way from the scope of the invention.

The invention claimed is:

1. A social system used for bringing virtual social network into real life comprising:
an electronic eye-glass unit wearable on a user's face, the electronic eye-glass unit including a processor and a capture module capturing an image, speech, facial expression, and body movement of at least one interlocutor, and an image of surroundings, in a real scene;
a social message processor portion identifying the at least one interlocutor according to the captured image, gathering a pre-configured social profile of the at least one interlocutor from a virtual social network based on the identification, and analyzing said social profile so as to generate at least one recommended conversation topic, said at least one recommended conversation topic being generated according to the analyzed social profile;
an augmented reality processor portion including a scene recognition unit generating a scene recognition result indicating a context of the interlocutor's real scene, said scene recognition result generated at least in part according to the captured image of the surroundings of the real scene, said social message processor portion determining a suitability of said at least one recommended conversation topic adaptive to the scene recognition result, the selective generation of said at least one recommended conversation topic being based on said suitability determined therefor; and an emotion analysis processor portion, analyzing said speech, facial expression, and body movement of the at least one interlocutor so as to determine an emotion state of the at least one interlocutor, wherein said at least one recommended conversation topic and said emotion state are provided to the user, and said social message processor portion generates a different conversation topic upon determination of inconsistency of said at least one recommended conversation topic with said emotion state of said interlocutor.

2. The social system according to claim 1, wherein information corresponding to said at least one recommended conversation topic and said emotion state of the at least one interlocutor are displayed on an image window.

3. The social system according to claim 2, further comprising a camera, said camera capturing the real scene in which the user talks with the at least one interlocutor, a video content of said real scene being displayed on said image window.

4. The social system according to claim 3, wherein said augmented reality processor portion further includes an unsalient region recognition processor portion, said unsalient region recognition processor portion recognizing at least one unsalient region from said real scene, said unsalient region remaining visually offset from views of either the interlocutor or complex image contours, said augmented reality processor portion adaptively positioning the information corresponding to said at least one recommended conversation topic and said emotion state in said at least one unsalient region.

5. The social system according to claim 4, wherein the information corresponding to said at least one recommended conversation topic and said emotion state are drawn in said at least one unsalient region via an object type.

6. The social system according to claim 5, wherein said augmented reality processor portion further comprises:
a photorealistic rendering processor portion performing a photorealistic rendering of the information corresponding to said at least one recommended conversation topic and said emotion state of the object type drawn in said at least one unsalient region; and
a stable rendering processor portion rendering the information corresponding to said at least one recommended conversation topic and said emotion state of the object type in an appropriate place of said at least one unsalient region in stabilized manner, wherein when said at least one unsalient region within said real scene is moved as the shooting angle changes, said at least one recommended conversation topic and said emotion state of the object type are adjusted in placement by said stable rendering processor portion correspondingly.

7. The social system according to claim 3, wherein said scene recognition unit, in order to generate the scene recognition result, recognizes and analyzes at least one of: the content of said real scene, location of said real scene, and shooting time of said real scene.

8. The social system according to claim 1, wherein said capture module comprises a face recognition processor portion, said face recognition processor portion executing to recognize the face feature of the at least one interlocutor, and then to compare the recognized face feature of the at least one interlocutor with at least one personal picture to which each identity account on the virtual social network corresponds, so as to ascertain an identity of the at least one interlocutor.

9. A social system used for bringing virtual social network into real life comprising:
an electronic eye-glass unit wearable on a user's face, the electronic eye-glass unit including a processor and a capture module capturing an image and behavior of at least one interlocutor and an image of surroundings;
a camera module capturing a real scene of the at least one interlocutor;
a social message processor portion, identifying the at least one interlocutor according to the captured image, gathering, based on the identification, and analyzing a pre-configured social profile of at least one interlocutor from a virtual social network so as to generate at least one recommended conversation topic, said at least one recommended conversation topic being generated according to the analyzed social profile;
a physiology capture sensor operably coupled to the processor, capturing at least one physiological response of the at least one interlocutor;
an emotion analysis processor portion analyzing said at least one physiological response of the at least one interlocutor so as to determine an emotion state of the at least one interlocutor; and
an augmented reality processor portion including an unsalient region recognition unit selectively determining at least one unsalient region within the real scene, said unsalient region being variably located and visually offset from views of either the interlocutor or complex image contours, said augmented reality processor portion adaptively positioning information corresponding to the at least one recommended conversation topic and emotion state in the at least one unsalient region for concurrent unobstructive display with the interlocutor, and said social message processor portion generating a different conversation topic upon determination of inconsistency of said at least one recommended conversation topic with said emotion state of said interlocutor.

10. The social system according to claim 9, wherein the information corresponding to said at least one recommended conversation topic and said emotion state of the at least one interlocutor are displayed on an image window.

11. The social system according to claim 10, wherein a video content of said real scene is displayed on said image window.

12. The social system according to claim 11, wherein said augmented reality processor portion further includes:
a scene recognition processor portion, said scene recognition processor portion being used to recognize and analyze at least one of: a content of said real scene, a location of said real scene, and a shooting time of said real scene so as to generate a scene recognition result; and,
said social profile of the at least one interlocutor and said scene recognition result being analyzed by said social message processor portion so as to generate said at least one recommended conversation topic.

13. The social system according to claim 9, wherein said physiology capture sensor includes at least one of a body temperature sensor, a blood pressure monitor, a breath monitor, a brain waves inspector, a pupil detector and an equipment capable of inspecting the physiological response of a body.

14. The social system according to claim 9, further comprising a capture module having a face recognition processor portion, said face recognition unit recognizing a facial feature of the at least one interlocutor, and then comparing the recognized facial feature of the at least one interlocutor with at least one personal picture to which each identity account on the virtual social network corresponds, to ascertain an identity of the at least one interlocutor.

15. The social system according to claim 9, wherein the information corresponding to said at least one recommended conversation topic and said emotion state are drawn in said at least one unsalient region via the means of an object type.

16. The social system according to claim 15, wherein said augmented reality processor module further comprises:
   a photorealistic rendering processor portion performing a photorealistic rendering of the information corresponding to said at least one recommended conversation topic and said emotion state of the object type drawn in said at least one unsalient region; and
   a stable rendering processor portion rendering the information corresponding to said at least one recommended conversation topic and said emotion state of the object type in an appropriate place of said at least one unsalient region in stabilized manner; wherein when said at least one unsalient region of said real scene is moved as the shooting angle changes, the information corresponding to said at least one recommended conversation topic and said emotion state of the object type are adjusted in placement by said stable rendering processor portion correspondingly.

17. A social method used for bringing virtual social network into real life comprising:
   establishing an electronic eye-glass unit on a user's face, the electronic eye-glass unit including a processor and a capture module;
   executing the processor to capture an image of at least one interlocutor and surroundings in a real scene, identify the interlocutor according to the captured image, gather a pre-configured social profile of the at least one interlocutor from a virtual social network based on the identification, and analyze said social profile to generate at least one recommended conversation topic for conversation, said at least one recommended conversation topic being generated according to the analyzed social profile;
   executing a scene recognition unit within an augmented reality processor portion to generate a scene recognition result indicating a context of the interlocutor's real scene, said scene recognition result generated at least in part according to the captured image of the surroundings;
   determining a suitability of said at least one recommended conversation topic adaptive to the scene recognition result, the selective generation of said at least one recommended conversation topic being based on said suitability determined therefor;
   enabling a user to talk with the interlocutor through the utilization of said at least one recommended conversation topic;
   capturing at least one of speech, facial expression, body movement, or physiological response of the at least one interlocutor;
   analyzing said speech, facial expression, body movement, or physiological response of the interlocutor so as to determine an emotion state of the interlocutor;
   indicating to the user said at least one recommended conversation topic and said emotion state of the at least one interlocutor; and,
   executing said processor to generate a different conversation topic upon determination of inconsistency of said at least one recommended conversation topic with said emotion state of said interlocutor.

18. The social method according to claim 17, further comprising:
   recognizing either a content of said real scene, or a location of said real scene, or a shooting time of said real scene to generate said scene recognition result.

19. The social method according to claim 17, further comprising:
   indicating to the user, during a conversation with the at least one interlocutor, a different conversation topic upon determination of said emotion state of said interlocutor being either one of boredom, lifelessness, or expressionlessness.

* * * * *